United States Patent
Schmitt

(10) Patent No.: US 6,357,321 B1
(45) Date of Patent: Mar. 19, 2002

(54) SPLIT CONNECTING ROD FOR AN INTERNAL COMBUSTION ENGINE AND METHOD OF PRODUCTION

(75) Inventor: Helmut Schmitt, Birkenau (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/448,343

(22) Filed: Nov. 23, 1999

(30) Foreign Application Priority Data

Nov. 25, 1998 (DE) .......................................... 198 54 462

(51) Int. Cl.[7] .................................................. G05G 1/00
(52) U.S. Cl. .............. 74/579 E; 74/579 R; 29/888.092; 29/425; 29/558
(58) Field of Search .......................... 74/579 R, 579 E; 29/888.092, 425, 558; 148/689

(56) References Cited

U.S. PATENT DOCUMENTS

| | | | |
|---|---|---|---|
| 3,994,054 A | 11/1976 | Cuddon-Fletcher et al. | 29/156.5 A |
| 4,569,109 A | 2/1986 | Fetouh | 29/156.5 A |
| 4,970,783 A | * 11/1990 | Olaniran et al. | 74/579 E X |
| 5,109,605 A | * 5/1992 | Hoag et al. | 29/888.09 |
| 5,507,093 A | * 4/1996 | Wittenstein et al. | 29/888.09 |
| 5,566,449 A | * 10/1996 | Okamoto et al. | 29/888.092 |
| 6,134,779 A | * 10/2000 | Walker et al. | 74/579 E X |

FOREIGN PATENT DOCUMENTS

| | | |
|---|---|---|
| DE | 43 34 555 A1 | 4/1995 |
| DE | 195 34 360 A1 | 8/1996 |
| DE | 196 17 402 A1 | 6/1997 |
| EP | 0 800 009 A2 | 10/1997 |
| EP | 0 863 322 A1 | 9/1998 |
| GB | 2344151 A * | 5/2000 .............. 74/579 E |
| JP | 2000-110825 * | 4/2000 .............. 74/579 E |

* cited by examiner

*Primary Examiner*—Vinh T. Luong
(74) *Attorney, Agent, or Firm*—Kenyon & Kenyon

(57) ABSTRACT

A connecting rod includes an apertured connecting-rod eye portion defining two portions (arms), which is split into a saddle portion and a bearing cap portion by a fracture splitting operation along a desired dividing plane whose location is determined by formation of a separating notch on the connecting-rod eye portion which extends parallel to the desired dividing plane. In each of the arm portions, through screw-holes are provided for attaching the bearing cap to the bearing saddle. During the splitting operation, the fracture separation is initiated at the separation notch and progresses in two paths around the screw-hole. To inhibit misalignment of the two fracture paths as they come together, a hole is formed in the plane of the desired dividing plane and extending from the through-hole to a wall of the connecting-rod eye remote from the separating notch.

7 Claims, 3 Drawing Sheets

SPLIT CONNECTING ROD FOR AN INTERNAL COMBUSTION ENGINE AND METHOD OF PRODUCTION

BACKGROUND OF THE INVENTION

1. Field of the Invention

This invention relates to a split connecting rod with a hole formed parallel to the separation plane and leading from the wall away from the separating notch and to a method of producing such a connecting rod by fracture separation.

2. Description of Related Art

The U.S. Pat. No. 4,569,109 to Fetouh discloses split bearing arrangements of connecting rods formed by means of fracture separation (cracking) which involves splitting off a bearing cap and defining the bearing bore. Through the use of this fracture-separation method, an accurately fitting joint between the bearing base and the bearing cap is achieved along the fracture surfaces, so that an accurate fit of the fine-machined bearing portion of the connecting rod is ensured with the associated pin of the crankshaft.

In order to reduce the fracture separation forces needed to form the bearing cap, a sintered connecting rod part may be used as a blank, which requires lower fracture forces on account of the material brittleness, as described in EP 0 800 009. Alternatively, as described in DE 43 34 555, with cast bearing blanks the fracture point may be specifically embrittled by embedding a brittle material. However, both methods lead to weaken the entire workpiece and are therefore not suitable for the production of bearing arrangements on connecting rods which are subjected to a high operating load and high forces and therefore impose especially high demands on the material strength. An example of this high strength requirement comes from the commercial-vehicle sector of motor-vehicle construction where connecting rods typically require strengths preferably obtainable by forged parts made of steel alloys. Here the material composition is selected in such a way that, on the one hand, high toughness is ensured, but, on the other hand, the admixing of a high carbon proportion increases the brittleness and thus improves the cracking capacity. For a specific fracture separation, a sharp V-shaped separating notch is made in the connecting rod in the region of the desired fracture separation plane, preferably in the region of the bearing surface. For the fracturing operation, this separating notch serves as a starting point for the starting crack. During the fracturing operation, the separation surfaces produced are predetermined and of annular configuration between the outside surface of the rod defined by the rod eye's cross-sectional shape and the inside surface formed by the usual through-holes provided for bolts used to subsequently attach the rod's bearing cap to its bearing saddle.

However, such an annular predetermined separation creates a problem relating to alignment or meeting of the fracture surfaces. One separation surface starts from the separating notch located on the inner wall of the connecting-rod eye, then branches into separate surfaces as the fracture encircles the through-hole in opposite directions. If the two surfaces do not meet at the same point at the opposite side from the notch a double fractures occurs which in an extreme case can cause material chipping which can lead to a defective missing spot thus weakening the material in the annular separation region. Depending on the geometry of the predetermined separation surface, up to 10% to 15% of the parts can be affected by such defects after cracking; and the connecting rods then no longer meet the strength requirements imposed on them and must be scraped. To lesson the problem, the cross section of the fracture plane, and thus also of the web at which the double fractures normally occurs, can be made smaller. However, this has an adverse effect on the stability and strength of the overall connecting rod.

The abovementioned double fracture problem is avoided, for example, in forged connecting rods made according to U.S. Pat. No. 3,994,054 to Cudden-Fletcher. In this patent, a through-hole is provided which serves as a point of application for a tapered cracking mandrel positioned on the connecting rods in the region of each predetermined separation surface parallel to the fracture plane. The mandrel divides the separation region into two (in each case cohesive) parts. In this patent, however, the inner walls of the through-holes are provided with separating notches which on one hand is very expensive to do and on the one hand requires a relatively large diameter of the through-holes. This leads to weakening of the connecting rod in the fracture surface region.

SUMMARY OF THE INVENTION

An object of the invention is to improve the process of fracture separating a connecting rod in such a way that the entire connecting rod has the highest possible strength and can be produced with the least possible production outlay and results in the least possible scrapage. In particular, the object of the invention is to configure the predetermined required separation region in such a way that perfectly accurately fitting joint surfaces as large as possible are produced while at the same time the occurrences of double fractures are minimised.

This object is achieved according to the invention by the features described hereinafter in detail. Accordingly, in the region of each predetermined separation surface of the connecting rod, a tubular hole is formed parallel to the predetermined separation surface and which extends from the through-hole to the outer surface or wall of the connecting-rod eye. The tubular hole leads into the wall of the connecting-rod eye opposite to the area of the separating notch. As the previously described two branches of the separation plane encircle the through-hole and approach each other from opposite directions, the tubular hole catches the dual fracture surfaces and thus prevents the occurrence of double or misaligned cracks.

An advantage of the configuration of the connecting rod according to the invention therefore results in a pronounced reduction in the scrapage during the cracking process. In this case, the tubular hole diameter may be selected to be very small, so that the area of the fracture surface is little reduced by the incorporation of the tubular hole and thus the stability and strength of the connecting rod is not reduced. The tubular hole is expediently arranged diametrically opposite the separating notch, so that both branches of the fracture surface essentially cover an equal length path before meeting at the tubular hole. Furthermore, the formation of a second tubular hole extending from the through-hole to the separating notch has been proved to be desirable by facilitating the division of the separation surface into the two separate individual surfaces which are progress separately from the notch and around the through-hole. These tubular holes are expediently produced during the machining phase by drilling and therefore require only a small additional working step.

In a preferred embodiment, the separating notch required for initiating the starting crack during the fracture separation of the connecting-rod eye is formed by broaching. Broaching has a production advantage in that it can be carried out during the course of the other machining. Alternatively, the separating notch may be made with the aid of laser machining; this method can ensure that the fracture runs in an exactly reproducible manner, a factor which leads to increased process reliability of the cracking process.

BRIEF DESCRIPTION OF THE DRAWINGS

The invention is explained in more detail below with reference to an exemplary embodiment shown in the drawings, in which.

DESCRIPTION OF THE PREFERRED EMBODIMENTS

Figure 1:
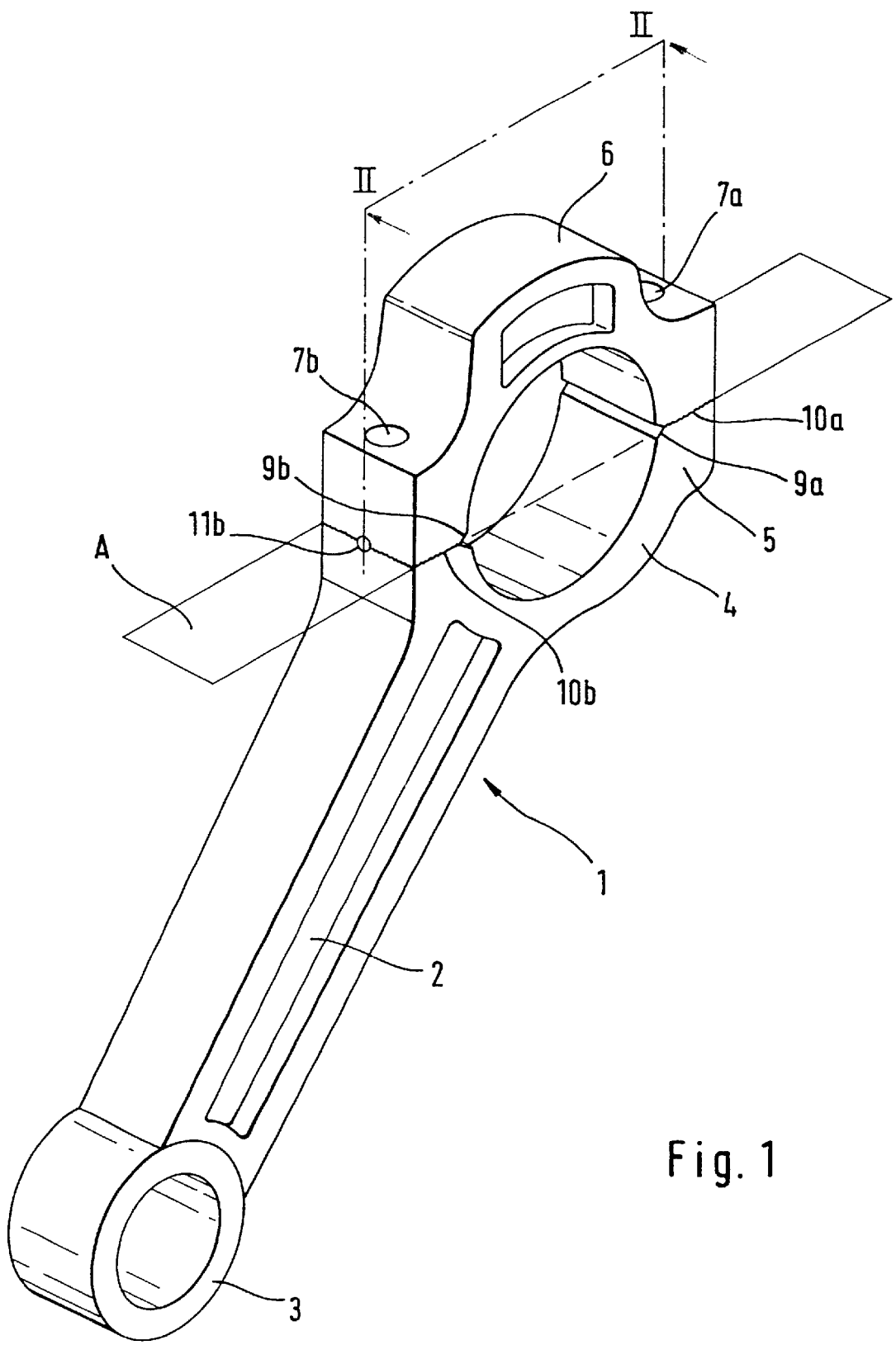
FIG. 1 shows a perspective representation of a connecting rod with a split connecting-rod eye.

FIG. 1 shows a connecting rod 1, which has a connecting-rod shank portion 2, a connecting-rod piston head portion 3 and a connecting-rod eye portion 4. The dividing plane A represents the predetermined breaking plane for the fracture separation of the connecting-rod eye portion 4 into a bearing saddle 5 and a bearing cap 6. In the region of the plane A, the connecting rod is provided with separating notches 9a and 9b. In the illustrated preferred embodiment, the notches 9a and 9b are made in the interior of the connecting-rod eye 4, i.e. in the region of the bearing as determined by the selected cracking process. Furthermore, through-holes 7a and 7b are formed through the region of dividing plane A for reception of fastening screws (not shown), which serve to attach the bearing cap 6 to the bearing saddle 5.

Figure 2:
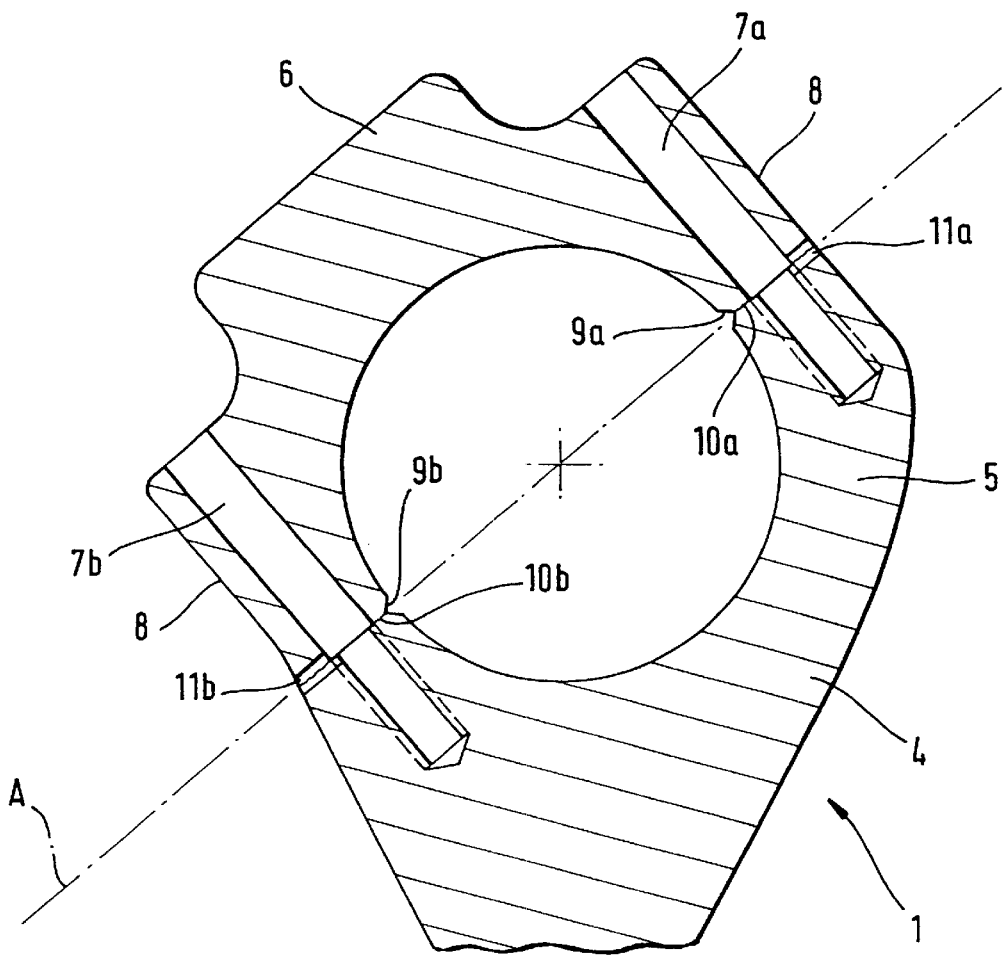
FIG. 2 shows a section II—II through the connecting-rod

As can be seen in FIG. 2, tubular holes 11a and 11b are formed parallel to and along the dividing plane A. Each tubular hole connects the outer walls 8 of the connecting-rod eye 4 to the through-hole 7a and 7b respectively. The tubular holes are each located along each predetermined desired separation surface 10a and 10b. In the embodiment shown in FIG. 2, the tubular holes are arranged diametrically opposite the respective separating notches 9a, 9b. The holes have the function of achieving a controlled fracture separation along the dividing plane A and of avoiding double fractures and cracks as previously explained.

Figure 3C:
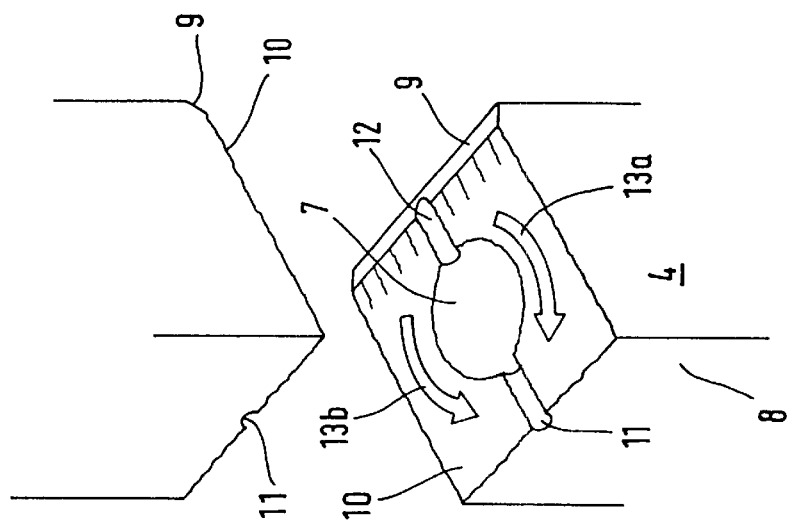
FIG. 3c shows a perspective representation of a separation surface of the connecting-rod eye with two tubular holes formed parallel to the separation surface in different regions.
Figure 3B:
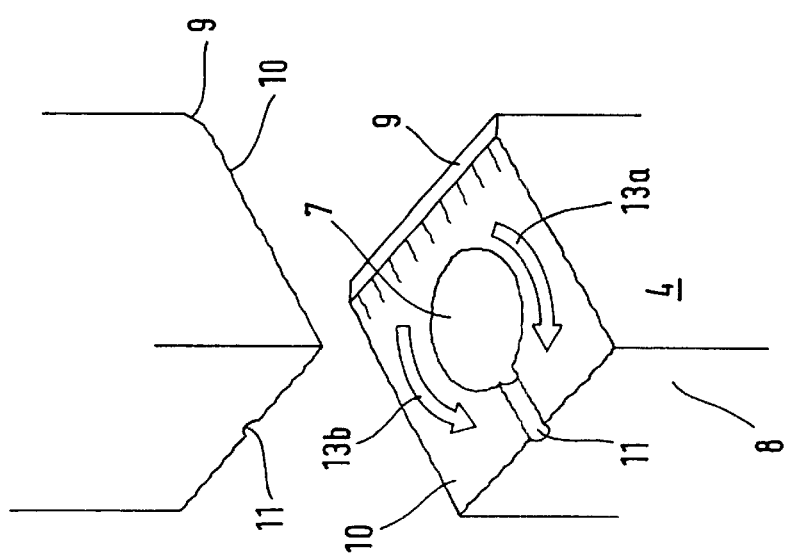
FIG. 3b shows a perspective representation of a separation surface of the connecting-rod eye with a tubular hole formed parallel to the separation surface in the unnotched region of the connecting-rod eye.
Figure 3A:
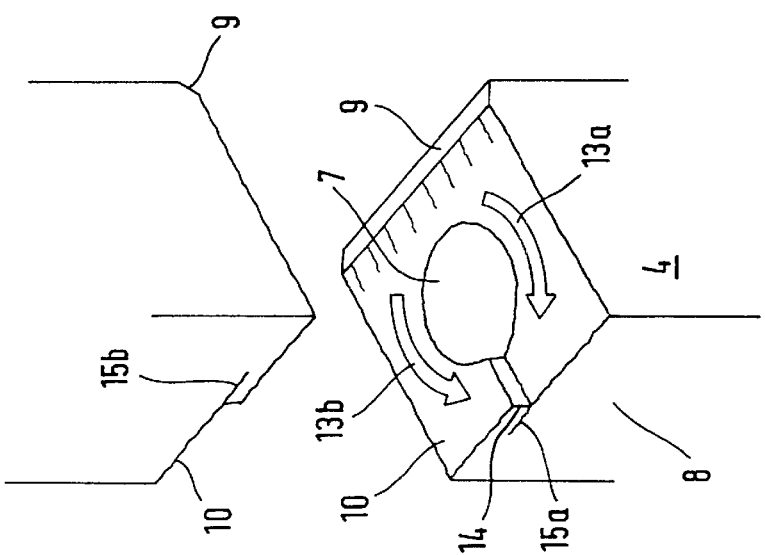
FIG. 3a shows a perspective representation of a separation surface of the connecting-rod eye with crack paths without a tubular hole parallel to the separation surface in the unnotched region of the connecting-rod eye.

The influence of this tubular hole on the fracture operation is shown in detail in FIGS. 3a to 3c where the predetermined separation surface 10 is shown extending in an annular manner around the through-hole 7. During cracking, the fracture separation is initiated at the separating notch 9, at which the initial starting crack is produced, and the starting crack then spreads two-dimensionally and are propagated across the fracture surface (as indicated in FIG. 3a by the direction of the arrows). More particularly, a partial or branch crack 13a extends around the through-hole 7 in the clockwise direction, whereas another branch crack 13b extends around the through-hole 7 in the opposite counter-clockwise direction. These two branch cracks 13a and 13b meet in a region remote from the separating notch 9. In FIG. 3a an undesirable situation may occur in which the two branch cracks 13a and 13b do not meet one another along a common line but are offset relative to one another by a surface 14. The result of this is that a double fracture 15a, 15b is produced when where the two cracks meet. The material present in the region of the double-fracture between lines 15a and 15b is extremely unstable and can easily flake off, which leads to an irreparable defective spot in the region of the predetermined separation surface 10.

As shown in FIG. 3b, the above defined defect is avoided by forming the tubular hole 11 according to the invention as described heretofore. The tubular hole 11 is parallel to and in the desired fracture plane and extends from the outer wall 8 of the connecting-rod eye 4 to the through-hole 7. The tubular hole 11 forms a termination for the branch cracks 13a and 13b as they propagate from both sides of the tubular hole 11. For this purpose, the diameter of the hole 11 should expediently be larger than the offset 14, which occurs in the event of a double fracture and is typically 1–2 mm. A hole diameter of about 2–4 mm is more practical for technical reasons related to production, that is a larger hole is simpler to drill. But at the same time the hole 11 is selected to be sufficiently small that the hole 11 does not significantly weakens the connecting rod 1 in the region of the dividing plane A.

In order that the hole 11 can fulfil its task as a branch-crack catcher, it must start at a location on wall 8 of the connecting-rod eye 4 in such a way that it pierces the annular predetermined desired separation surface 10 and intersect the through-hole 7 outside the separation notch. As seen in FIG. 3c, it may be advantageous, mainly for technical reasons related to production, to provide another tubular hole 12 which extends from the through-hole 7 to the connecting-rod eye's inside wall in which the separating notch 9 is formed. The predetermined separation surface 10 is divided into two separate individual surfaces by the hole 12 with branches of the crack progressing each from a separate part of the separating notch 9. Thereafter, each branch progresses independently during the cracking of the connecting rod and the two branches are collected at the hole 11.

The process of obtaining or making the connecting rod as shown in FIG. 1 starts from forming a blank and then the connecting-rod head 3 and the connecting-rod eye 4 are subjected to fine machining, i.e. the bearing holes are formed with the requisite accuracy. In the same working step, the holes 11 (or 11 and 12) are drilled in the region of the predetermined desired separation surface 10. Furthermore, if necessary, the through-holes 7 in the connecting-rod eye 4 are internally threaded. In addition, the separating notches 9 are formed in the region of the dividing plane A of the connecting-rod eye 4. This may be done, for example, by broaching, a factor which has the production advantage that the separating notches 9 can made in the same operating cycle as the rest of the machining. Alternatively, the separating notches 9 may be made by laser machining; this process has the advantage that the separating notch 9 as produced by laser notching constitutes a very deep and exact predetermined fracture point or line and the actual fracture surface therefore starts at the separating notch in a very reproducible manner, and thus increased process reliability of the cracking process is achieved.

Next, the connecting-rod eye 4 prepared as described above is then split by fracture separation along the dividing plane A into a bearing saddle 5 and a bearing cap 6. To this end, an appropriately designed separating tool is used, by means of which separating forces are exerted on the connecting-rod eye, and these separating forces lead to the generation of a starting crack at and along the separating notch and then to controlled fracture separation. In this case, the holes 11 tend to inhibit double fractures or cracks in the region of the predetermined separation surface 10.

The method according to the invention is especially suitable for the fracture separation of forged connecting rods, since they meet strength requirements normally imposed on connecting rods in an especially effective manner with a design incorporating large accurately fitting joint surfaces. However, the method may of course also be applied to connecting rods whose blanks have been produced from sintered, cast or solid material.

I claim:

1. A connecting rod, comprising:
    at least one connecting-rod eye portion including:
        a connecting-rod aperture;
        a first separating notch formed on a surface of the connecting-rod aperture;
        a second separating notch formed on the surface of the connecting-rod aperture opposite to the first separating notch, the connecting-rod eye portion being configured to separate into a saddle portion and a bearing end portion by fracture separation along predetermined separation surfaces arranged in a plane, the first separating notch and the second separating notch being disposed in the plane;
        a screw-hole extending through each separation surface; and
        a single tubular hole corresponding to and extending parallel to each separation surface and connecting the respective screw-hole to a wall of the connecting-rod eye portion located opposite to a respective one of the first separating notch and the second separating notch.

2. The connecting rod according to claim 1, wherein a diameter of the tubular hole is less than 5 mm.

3. A connecting rod, comprising:
    at least one connecting-rod eye portion including:
        a connecting-rod aperture;
        a first separating notch formed on a surface of the connecting-rod aperture;
        a second separating notch formed on the surface of the connecting-rod aperture opposite to the first separating notch, the connecting-rod eye portion being configured to separate into a saddle portion and a bearing end portion by fracture separation along predetermined separation surfaces arranged in a plane, the first separating notch and the second separating notch being disposed in the plane;
        a screw-hole extending through each separation surface; and
        a single tubular hole corresponding to and extending parallel to each separation surface and connecting the respective screw-hole to a wall of the connecting-rod eye portion located opposite to a respective one of the first separating notch and the second separating notch;
    wherein the tubular hole is arranged diametrically opposite to the respective one of the first separating notch and the second separating notch.

4. The connecting rod according to claim 3, wherein a diameter of the tubular hole is less than 5 mm.

5. A connecting rod, comprising:
    at least one connecting-rod eye portion including:
        a connecting-rod aperture;
        a split extending through the connecting-rod eye portion, the split being formed by fracture separation extending across the connecting-rod aperture;
        a first separating notch formed on a surface of the connecting-rod aperture;
        a second separating notch formed on the surface of the connecting-rod aperture opposite to the first separating notch, the first separating notch and the second separating notch being formed along a respective separation surface of the split;
        a screw through-hole extending through each separation surface;
        a first tubular hole extending in each separation surface; and
        a second tubular hole extending in each separation surface, a first one of the first tubular hole and the second tubular hole connecting the respective screw through-hole to a wall of the connecting-rod eye portion opposite to the respective separating notch, a second one of the first tubular hole and the second tubular hole connecting the respective screw through-hole to the corresponding one of the first separating notch and the second separating notch.

6. The connecting rod according to claim 5, wherein a diameter of at least one of the first tubular hole and the second tubular hole is less than 5 mm.

7. The connecting rod according to claim 5, wherein a diameter of the first tubular hole and the second tubular hole is less than 5 mm.

* * * * *